United States Patent
Nochimowski et al.

(10) Patent No.: US 8,959,285 B2
(45) Date of Patent: Feb. 17, 2015

(54) STORAGE SYSTEM WITH LOCAL AND REMOTE STORAGE DEVICES WHICH ARE MANAGED BY THE LOCAL STORAGE DEVICE

(75) Inventors: Alain Nochimowski, Tel Aviv (IL); Alon Marcu, Tel Mond (IL); Micha Rave, Herzliya (IL); Itzhak Pomerantz, Kfar Sava (IL)

(73) Assignee: SanDisk Technologies Inc., Plano, TX (US)

(*) Notice: Subject to any disclaimer, the term of this patent is extended or adjusted under 35 U.S.C. 154(b) by 442 days.

(21) Appl. No.: 12/101,065

(22) Filed: Apr. 10, 2008

(65) Prior Publication Data

US 2009/0172276 A1 Jul. 2, 2009

Related U.S. Application Data

(60) Provisional application No. 61/018,644, filed on Jan. 2, 2008, provisional application No. 61/018,979, filed on Jan. 4, 2008.

(51) Int. Cl.
G06F 12/00 (2006.01)
G06F 13/00 (2006.01)
G06F 13/28 (2006.01)
(Continued)

(52) U.S. Cl.
CPC ............ *G06F 3/0679* (2013.01); *G06F 3/0607* (2013.01); *G06F 3/0664* (2013.01)
USPC ........... 711/114; 711/103; 711/112; 711/170; 711/147; 711/148; 709/212; 709/214; 709/217

(58) Field of Classification Search
None
See application file for complete search history.

(56) References Cited

U.S. PATENT DOCUMENTS 5,509,134 A 4/1996 Fandrich et al.
6,745,286 B2 6/2004 Staub et al.
(Continued)

FOREIGN PATENT DOCUMENTS

GB 2 400 707 10/2004
WO 01/88780 11/2001
(Continued)

OTHER PUBLICATIONS

Anciaux et al., "A Tamper-Resistant and Portable Healthcare Folder," International Journal of Telemedicine and Applications, vol. 2008, 9 pgs., 2008.
(Continued)

*Primary Examiner* — Sanjiv Shah
*Assistant Examiner* — Marwan Ayash
(74) *Attorney, Agent, or Firm* — Brinks Gilson & Lione

(57) ABSTRACT

A method of servicing a command sent from a host device file system (HDFS) within a host device (HD) by a local storage device (LSD) in communication with the HD is described. The method includes receiving a first command at the LSD instructing the LSD to execute an operation on associated logical addresses. If the first command is associated with at least a first set of logical addresses, the method includes servicing the first command by the LSD at least by way of sending a second command to a device (RD) external to the LSD that instructs the RD to execute an operation on memory locations within the RD. If the first command is not associated with the first set of logical addresses, the method includes servicing the first command by the LSD only by way of operations executed by the LSD on memory locations within the LSD.

27 Claims, 5 Drawing Sheets

(51) Int. Cl.
*G06F 15/167* (2006.01)
*G06F 15/16* (2006.01)
*G06F 3/06* (2006.01)

(56) References Cited

U.S. PATENT DOCUMENTS

| | | | |
|---|---|---|---|
| 6,748,467 B2* | 6/2004 | Yamamoto | 710/65 |
| 6,986,030 B2 | 1/2006 | Shmueli et al. | |
| 7,085,879 B2 | 8/2006 | Aasheim et al. | |
| 7,143,420 B2 | 11/2006 | Radhakrishnan | |
| 7,406,489 B2 | 7/2008 | Soini et al. | |
| 7,747,837 B2 | 6/2010 | Gorobets et al. | |
| 2004/0088417 A1* | 5/2004 | Bober et al. | 709/227 |
| 2004/0243793 A1 | 12/2004 | Tang | |
| 2005/0160053 A1 | 7/2005 | Okamoto et al. | |
| 2005/0193161 A1 | 9/2005 | Lee et al. | |
| 2005/0203872 A1 | 9/2005 | Kwong Kwan | |
| 2005/0268339 A1 | 12/2005 | Bobrow | |
| 2006/0079284 A1 | 4/2006 | Lu et al. | |
| 2006/0107062 A1 | 5/2006 | Fauthoux | |
| 2006/0107330 A1 | 5/2006 | Ben-Yaacov et al. | |
| 2006/0288166 A1 | 12/2006 | Smith, Jr. et al. | |
| 2007/0033373 A1* | 2/2007 | Sinclair | 711/203 |
| 2007/0038567 A1 | 2/2007 | Allaire et al. | |
| 2007/0038749 A1* | 2/2007 | Noya et al. | 709/226 |
| 2007/0050538 A1* | 3/2007 | Northcutt et al. | 711/112 |
| 2007/0056042 A1 | 3/2007 | Qawami et al. | |
| 2007/0156998 A1 | 7/2007 | Gorobets | |
| 2007/0198634 A1 | 8/2007 | Knowles | |
| 2007/0198715 A1 | 8/2007 | Knowles | |
| 2007/0198716 A1 | 8/2007 | Knowles | |
| 2007/0198734 A1 | 8/2007 | Knowles | |
| 2007/0218945 A1 | 9/2007 | Agami et al. | |
| 2008/0027983 A1 | 1/2008 | Erol et al. | |
| 2008/0052781 A1 | 2/2008 | Bogot et al. | |
| 2008/0096559 A1 | 4/2008 | Phillips et al. | |
| 2008/0126680 A1 | 5/2008 | Lee et al. | |
| 2008/0270725 A1* | 10/2008 | Roden et al. | 711/165 |
| 2008/0301396 A1 | 12/2008 | Hamada et al. | |
| 2009/0043984 A1 | 2/2009 | Chang et al. | |
| 2009/0094160 A1 | 4/2009 | Webster et al. | |
| 2009/0171891 A1 | 7/2009 | Nochimowski et al. | |
| 2009/0171911 A1 | 7/2009 | Nochimowski et al. | |
| 2009/0172050 A1 | 7/2009 | Nochimowski et al. | |
| 2009/0172217 A1 | 7/2009 | Nochimowski et al. | |
| 2009/0172274 A1 | 7/2009 | Nochimowski et al. | |
| 2009/0172275 A1 | 7/2009 | Nochimowski et al. | |
| 2009/0172400 A1 | 7/2009 | Rave et al. | |
| 2009/0172694 A1 | 7/2009 | Nochimowski et al. | |

FOREIGN PATENT DOCUMENTS

| | | |
|---|---|---|
| WO | WO 2005/125072 | 12/2005 |
| WO | WO 2007/019258 | 2/2007 |
| WO | WO 2007/044947 | 4/2007 |

OTHER PUBLICATIONS

Search Report dated Sep. 10, 2010 in EP Application No. 10 007 973.0.
Office Action dated Oct. 6, 2010 in U.S. Appl. No. 12/059,107.
Office Action dated Oct. 5, 2010 in U.S. Appl. No. 12/123,304.
Office Action dated Sep. 3, 2010 in U.S. Appl. No. 12/123,252.
International Search Report dated Aug. 7, 2009 in PCT Application No. PCT/US2008/087695.
Written Opinion dated Aug. 7, 2009 in PCT Application No. PCT/US2008/087695.
Potter et al., "WebPod: Persistent Web Browsing Sessions with Pocketable Storage Devices," Proceedings of the 14th International Conference on the World Wide Web, [Online] May 14, 2005, pp. 603-612.
Lahti et al., "A Mobile Phone-based Context-aware Video Management Application," Proceedings of SPIE—The International Society for Optical Engineering 2006 SPIE, vol. 6074.
Ravi et al., "Securing Pocket Hard Drives," IEEE Pervasive Computing, IEEE Service Center, Los Alamitos, CA, vol. 6, No. 4, Oct. 1, 2007, pp. 18-23.
U.S. Appl. No. 11/967,938, filed Dec. 31, 2007.
U.S. Appl. No. 11/964,060, filed Dec. 26, 2007.
www.allinyourpocket.com, "All your files in your pocket!" downloaded Apr. 15, 2008.
Baird et al., "Distributed Information Storage Architecture," Twelfth IEEE Symposium on Mass Storage Systems, 1993, pp. 1051-9173.
Melazzi et al., "The Simplicity Project: easing the burden of using complex and heterogeneous ICT devices and services," URL: http://www.ist-simplicity.org/_publications/Mobile%20Summit%202004%20-%20Paper%20State%20of%20Art.pdf, 8 pages.
Wang, Jinghua, "VHE Smart Card Manager," URL: http://jerry.c-lab.de/vhelab/r_smartcard.html, Feb. 7, 2003.
Hennessy et al., Computer Organization and Design, Morgan Kaufmann Publishers, Inc., Second Edition, pp. 675-678.
Mani et al., SenSys '06, Nov. 1-3, 2006, Boulder, Colorado, USA ACM, pp. 425-426.
Office Action issued in U.S. Appl. No. 12/019,573, dated Mar. 1, 2011 (33 pages).
Office Action issued in U.S. Appl. No. 12/029,356, dated Dec. 27, 2010 (13 pages).
Office Action issued in U.S. Appl. No. 12/029,356, dated Mar. 25, 2011 (40 pages).
Office Action issued in U.S. Appl. No. 12/059,107, dated Apr. 4, 2011 (9 pages).
Office Action issued in U.S. Appl. No. 12/123,304, dated Mar. 11, 2011 (12 pages).
Office Action issued in U.S. Appl. No. 12/177,006, dated Nov. 24, 2010 (11 pages).
Office Action issued in U.S. Appl. No. 12/177,006, dated Mar. 15, 2011 (8 pages).
Sim Application Toolkit (SAT) [online], May 19, 2007 [retrieved on Dec. 13, 2010] from URL: http://www.sanjayahuia.com/tutorials/SimApplicationToolkit.html (9 pages).
Zeinalipour-Yazti et al., "MicroHash: An Efficient Index Structure for Flash-Based Sensor Devices", FAST 05 (14 pages).
Office Action for U.S. Appl. No. 12/019,573, dated Dec. 8, 2011, 27 pages.
Office Action for U.S. Appl. No. 12/045,472, dated May 9, 2011, 12 pages.
Notice of Allowance for U.S. Appl. No. 12/045,472, dated Oct. 27, 2011, 5 pages.
Office Action for U.S. Appl. No. 12/059,107, dated Jan. 3, 2012, 7 pages.
Office Action for U.S. Appl. No. 12/123,252, dated Apr. 11, 2011, 12 pages.
Office Action for U.S. Appl. No. 12/123,252, dated Oct. 21, 2011, 13 pages.
Office Action for U.S. Appl. No. 12/177,006, dated Dec. 6, 2011, 10 pages.
Examiner's Report for European Patent Application Serial No. 08 870 111.5, dated Jan. 20, 2011, 6 pages.
European Search Report for European Patent Application Serial No. 10 007 974.8, dated Jan. 20, 2011, 6 pages.
Office Action for U.S. Appl. No. 12/036,440, dated Mar. 5, 2012, 27 pages.

* cited by examiner

STORAGE SYSTEM WITH LOCAL AND REMOTE STORAGE DEVICES WHICH ARE MANAGED BY THE LOCAL STORAGE DEVICE

CROSS REFERENCE TO RELATED APPLICATIONS

This patent application takes priority under 35 U.S.C. 119 (e) to (i) U.S. Provisional Patent Application No. 61/018,644 filed on Jan. 2, 2008 entitled "DISTRIBUTED STORAGE SERVICE SYSTEMS AND ARCHITECTURE" by Nochimowski et al., and (ii) U.S. Provisional Patent Application No. 61/018,979 filed on Jan. 4, 2008 entitled "DISTRIBUTED STORAGE SERVICE SYSTEMS AND ARCHITECTURE" by Nochimowski et al., each of which are incorporated by reference herein in their entirety and for all purposes.

This application is also related to (i) co-pending U.S. patent application Ser. No. 12/019,573 filed on Jan. 24, 2008 entitled "DISTRIBUTED STORAGE SERVICE SYSTEMS AND ARCHITECTURE" by Nochimowski et al., (ii) co-pending U.S. patent application Ser. No. 12/029,356 filed on Feb. 11, 2008 entitled "STORAGE DEVICE HAVING DIRECT USER ACCESS" by Nochimowski et al., (iii) co-pending U.S. patent application Ser. No. 11/967,938 entitled LOCAL PROXY SYSTEM AND METHOD by Mosek et al., filed Dec. 31, 2007, (iv) Ser. No. 12/036,440 entitled "CACHE MANAGEMENT" by Nochimowski et al., filed Feb. 25, 2008, (v) Ser. No. 12/045,472 entitled "DIGITAL CONTENT DISTRIBUTION AND CONSUMPTION," by Rave et al., filed Mar. 10, 2008, (vi) Ser. No. 12/059,107 entitled "DATA USAGE PROFILING BY LOCAL STORAGE DEVICE," by Nochimowski et al., filed Mar. 31, 2008, (vii) Ser. No. 12/123,252 entitled "DATA INDEXING BY LOCAL STORAGE DEVICE," by Nochimowski et al., filed May 19, 2008, and (viii) Ser. No. 12/123,304 entitled "DATA INDEXING BY LOCAL STORAGE DEVICE," by Nochimowski et al., filed May 19, 2008, each of which are incorporated by reference herein in their entirety and for all purposes.

FIELD OF THE INVENTION

The present invention relates generally to digital devices. More particularly, the present invention relates to providing virtual storage with a local storage device.

BACKGROUND

The concept of user-controlled expansion of local storage devices is known in the prior art (see U.S. patent application Ser. No. 11/636,540 "DEVICE AND METHOD FOR CONTROLLING USAGE OF A MEMORY CARD" by Agami et al). This concept is traditionally built on a statically pre-determined physical memory array, part of which is hidden from the host file system and hence the user, and which may only be activated upon user request. Such a user request may be initiated remotely by the device controller and may include payment. However, this approach has a number of shortcomings, not the least of which include: the size of the manufactured memory array is determined at production time resulting in an inability for the user to further expand the storage capacity of the memory array beyond the pre-determined hidden capacity, i.e., there is no usage flexibility etc., and, the ratio between hidden and exposed memory is determined at production time, or in any case, before the local storage device reaches the user. By way of example, a device vendor may manufacture a number of memory devices each having a total storage capacity of 2 GB. However, the memory devices may be sold as 1 GB memory devices with the remaining 1 GB being hidden from, or at least rendered inaccessible to, the user. Even if the second GB is accessible upon payment by the user, the manufacturer of the memory device bears a risk; that is, that the user will not be able to access the second hidden GB without first paying the manufacturer.

One way to overcome the limitations of such physically expandable storage devices is through a proprietary client agent integrated into the Host that provides an abstraction of the storage whether local (i.e. accessed by the agent through legacy mass storage commands) or remote (i.e. accessed by the agent through network protocols). This particular approach has been implemented in various products such as that manufactured by Personalite Numerique and described in French patent FR0412199. However, since the client agent is typically application specific, its use is limited to specific platforms. Due in part to the heterogeneity of host operating systems, particularly in mobile platforms, the usefulness of the client agent may be quite limited. Additionally, since different mobile handsets may run on various different operating systems, such implementation typically requires complex software integration. This software integration generally proves even more complex when using mobile handsets that run on "closed" operating systems (such as Nucleus) as opposed to that of "open" operating systems such as Windows, Symbian, and the like.

Therefore, a method, system, and apparatus that overcomes the above-mentioned limitations while still affording the opportunity to operate in legacy LBA/mass storage mode (i.e. compatible with current legacy host file systems) is desired.

SUMMARY OF THE DESCRIBED EMBODIMENTS

According to particular embodiments of the present invention, various methods, devices and systems are described for servicing a management command send from a host device (HD) to a local storage device (LSD). In one aspect, a method of servicing a management command sent from a host device file system (HDFS) within a host device (HD) by a local storage device (LSD) in communication with the HD is described. The method includes receiving a first management command at the LSD instructing the LSD to execute an operation on associated logical addresses. If the first management command is associated with at least a first set of logical addresses, the method includes servicing the first management command by the LSD at least by way of sending a second management command to a device (RD) external to the LSD that instructs the RD to execute an operation on memory locations within the RD. In various embodiments, the sending of the second management command to the RD and the execution of the operation associated with the first management command on the memory locations within the RD are invisible to the HDFS. If the first management command is not associated with the first set of logical addresses, the method includes servicing the first management command by the LSD only by way of operations executed by the LSD on memory locations within the LSD. In various embodiments, the LSD does not utilize any other physical interface to any other device external to the LSD other than that provided via the HD.

According to particular embodiments, if the management command is associated with at least the first set of logical addresses, the method further includes prompting the HD by the LSD to establish a communication path between the LSD and the RD via the HD. In a preferred embodiment, once the communication path is established, no further intervention by the HD is required except to maintain the communication path.

In a system aspect of the invention, a computing system is described that includes a host device (HD) having at least a host device file system (HDFS) and a local storage device (LSD) coupled with the HD by means of an HD/LSD interface. The LSD includes a memory array and an LSD controller arranged to locally manage the memory array. The memory array is logically arranged to include at least one mass storage region externally managed by the HDFS via the LSD controller by sending a management command to the LSD controller by way of the HD/LSD interface. The management command may instruct the LSD to execute an operation on associated memory addresses. According to particular embodiments, if the LSD controller determines that a first management command received from the HDFS is associated with at least a first set of logical addresses, the LSD controller services the first management command at least by way of sending a second management command to a device (RD) external to the LSD that instructs the RD to execute an operation on memory locations within the RD, the sending of the second management command to the RD and the execution of the operation associated with the first management command on the memory locations within the RD being invisible to the HDFS. Additionally, in some embodiments, if the LSD controller determines that the first management command received from the HDFS is associated with at least a second set of logical addresses, the LSD controller services the first management command by way of operations executed by the LSD on memory locations within the LSD mass storage region.

In another aspect, a computer system is described that includes a host device (HD) having at least a host device file system (HDFS). The system further includes a local storage device (LSD) coupled with the HD by means of an HD/LSD interface, the LSD including a memory array and an LSD controller arranged to locally manage the memory array, the memory array being logically arranged to include at least one mass storage region externally managed by the HDFS via the LSD controller by sending management commands to the LSD controller by way of the HD/LSD interface. In various embodiments, the HDFS is further configured to manage a device (RD) external to the LSD via the LSD by way of sending a first management command to the LSD that instructs the LSD to forward a second management command to the RD.

In sill another aspect, logic encoded in one or more tangible media within a local storage device (LSD) for servicing a management command sent from a host device file system (HDFS) within a host device (HD) in communication with the LSD is described. When executed the logic is operable to receive a first management command at the LSD, the first management command instructing the LSD to execute an operation on associated logical addresses, and if the first management command is associated with at least a first set of logical addresses, service the first management command by the LSD at least by way of sending a second management command to a device (RD) external to the LSD that instructs the RD to execute an operation on memory locations within the RD, the sending of the second management command to the RD and the execution of the operation associated with the first management command on the memory locations within the RD being invisible to the HDFS, otherwise, service the first management command by the LSD only by way of operations executed by the LSD on memory locations within the LSD.

BRIEF DESCRIPTION OF THE DRAWINGS

For a better understanding of the invention, reference should be made to the following detailed description taken in conjunction with the accompanying drawings, in which.

Note that like reference numerals refer to corresponding parts throughout the drawings.

DETAILED DESCRIPTION OF THE DESCRIBED EMBODIMENTS

Figure 1:
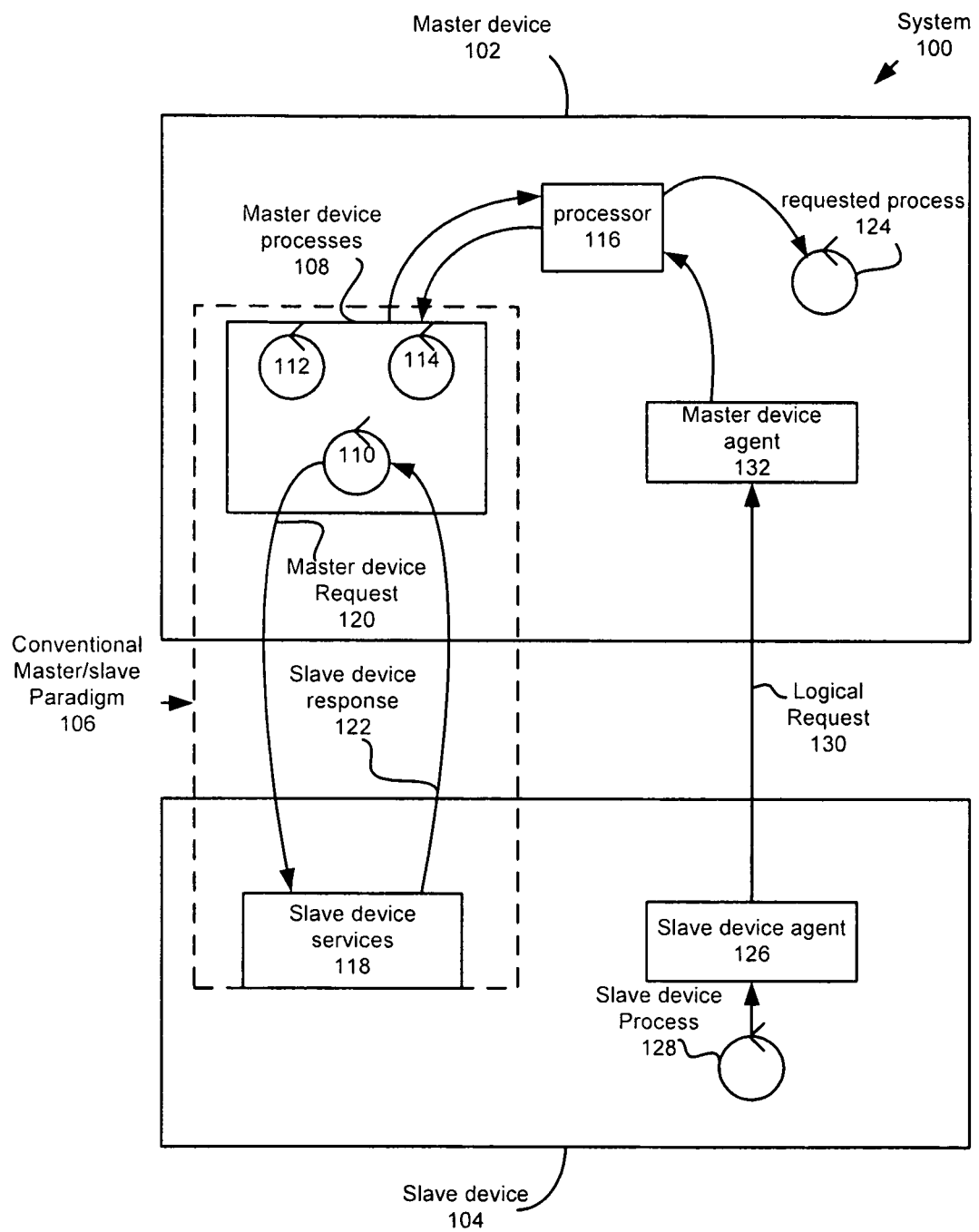
FIG. 1 shows a symbolic representation of a system in accordance with an embodiment of the invention.

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

Particular embodiments of the present invention provide remotely enabled virtual expansion of the storage capacity of a local storage device as seen by an associated managing host device. While the concept of remotely/user-controlled expansion of local storage devices is not new, the present invention provides a new and innovative approach. Generally, all non-volatile storage devices include a statically pre-determined physical memory array. However, part of the memory array is generally hidden from the host device file system and, as a result, is hidden from the host device and ultimately the user. In conventional implementations, the size of the manufactured memory array is determined at the time of production and, hence, there is no ability for the user to further expand the physical storage capacity of the memory array beyond the confines of the pre-determined hidden capacity; that is, there is no flexibility in the total storage capacity of the memory array. In contrast, it is a goal of the present invention to provide flexible expansion of the storage capacity of a local storage device as perceived by the host device file system of a host device.

The following description of particular embodiments describes a local storage device that incorporates non-volatile memory. By way of example, non-volatile storage devices may be FLASH or EEPROM based storage devices. The local storage device may either be a removable or a non-removable (fixed) device. As is well known, non-removable devices are not intended for subsequent removal once they have been connected with the host whereas removable devices are configured so as to be readily removed or added to the host.

One type of removable device that is well suited for implementing the present invention is a memory card. Memory cards are commonly used to store digital data for use with various electronics products. The memory card is often removable from the electronic system so that the stored digital data may be portable. The memory cards may have a relatively small form factor and be used to store digital data for electronics products that acquire data, such as cameras, media players/recorders (e.g., MP3 devices), hand-held or notebook computers, personal digital assistants (PDAs), cellular phones, network cards, network appliances, set-top boxes, and hand-held or other devices.

The local storage device described herein may be compatible with any memory card format, such as a secured digital (SD) memory card format used for managing digital media such as audio, video, or picture files. The storage device may also be compatible with a multi media card (MMC) memory card format, a compact flash (CF) memory card format, a flash PC (e.g., ATA Flash) memory card format, a smartmedia memory card format, or with any other industry standard specifications. One supplier of these memory cards is SanDisk Corporation of Milpitas, Calif. The storage device may also apply to other erasable programmable memory technologies, including but not-limited to electrically-erasable and programmable read-only memories (EEPROMs), EPROM, MRAM, FRAM ferroelectric and magnetic memories. Note that the storage device configuration does not depend on the type of removable memory, and may be implemented with any type of memory, whether it being a flash memory or another type of memory. The storage device may also be implemented with a one-time programmable (OTP) memory chip and/or with a 3 dimensional memory chip technology.

Host systems with which such memory cards are used include personal computers, notebook computers, hand held computing devices, cellular telephones, cameras, audio reproducing devices, and other electronic devices requiring removable data storage. Flash EEPROM systems are also utilized as bulk mass storage embedded in host systems. The storage device may be part of a local proxy system that may be implemented on PDAs (Personal Digital Assistants), mobile handsets, and other various electronic devices. A PDA is typically known as user-held computer systems implemented with various personal information management applications, such as an address book, a daily organizer, and electronic notepads, to name a few.

Particular embodiments of the invention are discussed below with reference to FIGS. 1-8. However, those skilled in the art will readily appreciate that the detailed description given herein with respect to these figures is for explanatory purposes as the invention extends beyond these limited embodiments.

FIG. 1 shows a symbolic representation of master device/slave system 100. By way of example, according to particular embodiments described herein, the slave device may take the form of a local storage device such as but not limited to any of the aforementioned local storage devices described above while the master device takes the form of a host device such as but not limited to any of the aforementioned host devices described above. It should be noted that master/slave is a model for a communication protocol in which one device or process has unidirectional control over one or more other devices. In a conventional system, once a master/slave relationship between devices or processes is established, the direction of control is always from the master to the slaves. In some systems a master is elected from a group of eligible devices with the other devices acting in the role of slaves.

Accordingly, master/slave system 100 (hereinafter referred to simply as system 100) includes master device 102 and slave device 104 that relate to each other, in part, by way of conventional master/slave paradigm 106. It should also be noted that in the described embodiments, slave device 104 does not utilize any interface to any device external to master device 102 other than that provided by master device 102.

Master device 102 may operate a number of master device processes 108. By master device process it is meant a process executed solely for the benefit of the master device. Such master device processes may include any number and type of processes such as, for example, a fetch instruction command useful in providing master device 102 with an executable instruction. Master device processes 108 may include master device processes 110, 112, and 114 each of which may be executed by processing unit 116. Any of the processes 110, 112 or 114 may request service from slave device services 118. Process 110, for example, may request service from slave device service 118 by generating master device request 120. Slave device service 118 may respond to master device request 120 with slave service response 122. For example, master device request 120 may take the form of a READ command and requested slave service response 122 may take the form of DATA. However, within the confines of conventional master/slave paradigm 106, slave device 104 may not prompt nor in any manner cause master device 102 to execute any process outside of master device processes 108. In other words, within the context of conventional master/slave paradigm 106, only master device 102 may execute at least one of the master device processes 108.

However, the invention circumvents the conventional master/slave paradigm 106 by allowing slave device 104 to prompt processor 116 to execute requested process 124 for the benefit of slave device 102. In this way, requested process 124 may be executed by processor 116 and yet may be totally independent of and unrelated to any of the master device processes 108. Slave device 104 may include slave device agent 126 that may associate slave device process 128 with slave device logical request 130. Master device 102 may include master device agent 132 in communication with processor 116 and slave device 104 by way of slave device logical request 130. Master device agent 132 may use slave device logical request 130 to prompt processor 116 to execute requested slave device process 124. In this way, a logical request generated by a slave device may be converted into a master device provided physical response unrelated to and independent of any master device initiated process.

As will become clear from the following description, the ability of a slave device to initiate a master device provided physical response may be advantageously exploited to provide additional benefit to the master device. By way of example, according to the invention, a first slave device may initiate a master device provided physical response that causes the master device to establish a communication path between the first slave device and a second slave device. According to particular embodiments in which both slave devices are storage devices, the master device may initiate a storage operation by way of a master device command sent to the first storage device. Although the master device command is always "serviced" by the first storage device at least in that any response to the master device command is transmitted via the first storage device to the master device, the first storage device determines, based in part on the command, whether to execute the requested storage operation on itself and/or, forward a command to the second storage device by way of the communication path established at the behest of the first storage device, at which point the second storage device may execute a requested storage operation on itself. Furthermore, both the establishment of the communication path and the logical interaction between the first and second slave devices may be hidden from the file system of the master device.

The invention will now be described in terms of more specific embodiments, all of which are in keeping with the spirit and scope of the invention. It should be noted that any functional blocks or functional arrangements described herein may be implemented as either a physical entity or as a logical entity, or as a combination of both.

Figure 2:
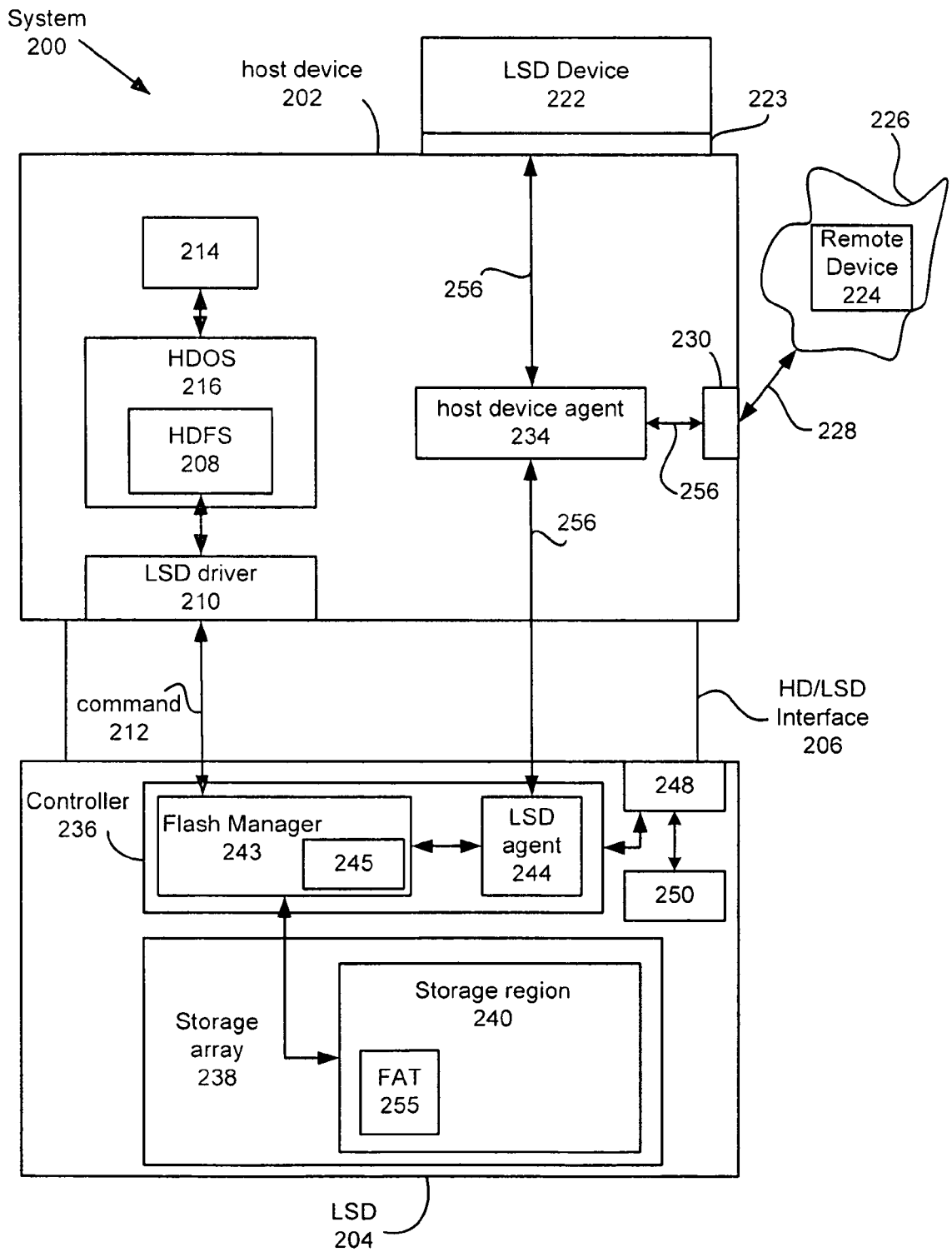
FIG. 2 illustrates a host device/local storage device system in accordance with an embodiment of the invention.

FIG. 2 shows a computing system 200 in accordance with an embodiment of the invention. System 200 includes a slave device that takes the form of local storage device (LSD) 204. System 200 also includes a master device that takes the form of host device (HD) 202. LSD 204 may communicate with HD 202 by way of HD/LSD interface 206. It should be noted that HD/LSD interface 206 may be configured as a mechanical entity (such as a socket or interconnecting bus) into which HD 202 and LSD 204 may mechanically connect. However, in some embodiments, HD/LSD interface 206 may take the form of a wireless interface. While HD 202 necessarily includes a processor, for the sake of clarity, the processor included in HD 202 is neither shown nor mentioned further in this discussion but is, nonetheless, presumed to be present. In many embodiments, LSD 204 does not utilize any interface to a device external to HD 202 other than that interface provided by the HD 202. In other words, LSD 204 may be connected exclusively to HD 202 and therefore may be unable to access or otherwise communicate with circuits and/or applications external to computing system 200 without intervention by HD 202.

HD 202 includes a host device file system (HDFS) 208 in communication with LSD driver 210. Typically, HDFS 208 is a part of a host device operating system (HDOS) 216 that typically resides in host device main memory (that may take the form of a hard disk drive, or HDD, as well as non-volatile memory such as FLASH memory). In the described embodiment, HDFS 208 is configured to issue an LSD management command 212 to LSD driver 210. LSD driver 210 may, in turn, pass LSD management command 212 (appropriately formatted) to LSD 204 by way of HD/LSD interface 206. By way of example, LSD management command 212 may take the form of a block command in those cases where LSD 204 is configured to include a data storage array having logical block address (LBA) architecture. HD 202 may also include (internal) software application 214. By internal application it is meant that software application 214 may utilize HDFS 208 and LSD driver 210 to communicate with LSD 204. In the described embodiment, software application 214 may utilize HDFS 208 and LSD driver 210 to communicate with LSD 204 and is therefore "visible" to HDFS 208.

System 200 also includes at least a second storage device. The second storage device may reside in any number of locations either locally or remotely. In one embodiment, the second storage device is an external device in the form of a second LSD 222 coupled by way of interface 223 to HD 202. In other embodiments, the second storage device may be a remote device 224 included in a network 226 in communication with HD 202 by way of a network link 228 at network interface 230. In this way, a command path using network link 228 may be established between remote device 224 and HD 202 through which information may pass. In still other embodiments, the second storage device may be a non-removable device embedded within HD 202.

In the described embodiment, network interface 230 facilitates communication between HD 202 and network 226 by way of the network link 228. By way of example, if network 226 is an IP protocol type network, then network interface 230 may establish an IP protocol based network link 228 between, for example, application 214 and any network device, e.g., remote device 224, included in network 226. It should be noted that network interface 230 may be physically located anywhere deemed appropriate. For example, network interface 230 may be incorporated into HD 202. However, network interface 230 may also be located in any physical location not included in HD 202 (or system 200) but still be utilized by HD 202 to establish the appropriate network link 228 with network 226. Network interface 230 is therefore not limited to being physically incorporated within or in close proximity to HD 202.

Master device agent 132 may take the form of host device agent 234 that provides, in addition to the functions described above with regards to master device agent 132, at least a bridging functionality between storage services provided by LSD 204 and any available external resources. In the described implementation, host device agent 234 may be used to identify an LSD logical request by any means appropriate (such as polling or interrupts). Moreover, host device agent 234 may be configured to route and/or maintain a communication path to/from an external device such as external device 222 or remote device 224 and LSD 204 once established.

LSD 204 includes controller 236 and storage array 238 having at least a first mass storage region 240. It should be noted that storage array 238 may be formed of an array of memory cells (such as FLASH). Although, in the described embodiment, the storage array 238 may be presumed to be an array of FLASH memory cells, the invention is not limited only to FLASH type memory cells as it is contemplated that the invention may be used with any appropriate type of memory cell. Included in controller 236 is flash manager 243 that may manage mass storage region 240 according at least to host/LSD paradigm 106 (i.e., acting at the behest of HDFS 208 and according to HDFS issued commands). More specifically, flash manager 243 may be configured to translate physical/array level flash commands to logical block/sector level commands and vice versa. Controller 236 also includes a mapping module 245 (described in more detail below) which, in the described embodiment, may be a part of flash manager 243. In a particularly useful arrangement, storage array 238 may include an LBA based mass storage region. The LBA based mass storage region may, in turn, include mass storage region 240. In this way, mass storage region 240 may be compatible with a legacy installed base. Accordingly, the location of blocks of data stored in mass storage region 240 may be specified using logical block addressing (LBA) where each block may be, for example, on the order of 512 or 1024 bytes each. In this way, mass storage region 240 may be fully backward compatible with any contemplated legacy mass storage architectures (i.e. able to work in conjunction with legacy hosts) and more specifically LBA type systems. In particular, LSD 204 (and more particularly, mass storage region 240) may operate under standard LBA architecture using legacy interfaces, busses, and all associated protocols providing for full compatibility with installed base of legacy products.

Controller 236 also includes LSD agent 244 that may act as a bridge establishing a communication path 256 at the behest of the controller 236 between flash manager 243, and particularly mapping module 245, and external storage device 222 or remote device 224 via host device agent 234. It should be noted that this communication path 256 is not routed through the HDFS 208 and hence may be invisible to the HDFS 208. The details of the establishment of a communication path 256 between LSD agent 244 and host device agent 234 are described in more detail in (i) co-pending U.S. patent application Ser. No. 12/019,573 filed on Jan. 24, 2008 entitled "DISTRIBUTED STORAGE SERVICE SYSTEMS AND ARCHITECTURE" by Nochimowski et al., and (ii) co-pending U.S. patent application Ser. No. 12/029,356 filed on Feb. 11, 2008 entitled "STORAGE DEVICE HAVING DIRECT USER ACCESS" by Nochimowski et al., both of which are incorporated by reference herein for all purposes. It should be noted that, in various embodiments, LSD agent 244 is also capable of performing various storage operations (e.g., a read operation) on storage region 240 and, furthermore, may be aware of the file system structure and metadata associated with the data stored within mass storage region 240. Such file structure awareness may be implemented by configuring LSD agent 244 to read and traverse the file metadata stored within mass storage region 240 including data within a file allocation table.

LSD agent 244 may also manage a network stack/interface 248, which in some embodiments may be a part of controller 236, that provides a mechanism for controller 236 to communicate with external devices and/or target applications using standard protocols (such as Internet Protocol, or IP) and any available network resources. In particular, LSD 204 may translate any network communication (such as LSD logical request 130) into a standard format (such as physical bus-based format) so as to enable host device agent 234 to execute instructions (such as a message fetch) in a manner appropriate to an LBA based implementation of HD/LSD interface 206. In this way, any fetched message, for example, may be successfully conveyed over network link 228 created between host device agent 234 and an external device. In this regard, network stack/interface 248 may be considered to be part of LSD agent 244. LSD agent 244 may also provide authentication and security services to an LSD application 250, which may be running off of controller 236, as well as manage any incoming service requests.

It will be appreciated that mass storage region 240 may be partitioned into separate internal regions. These partitioned regions may each be acted upon so that they may interact with each other and/or circuits and/or software applications external to LSD 204 in any appropriate manner. Such external circuitry may include for example, HD 202 (that includes all components therein, such as host file system 208), external LSD 222, or any of a number of external devices included in network 226 such as remote device 224.

While HDFS 208 effectively manages the mass storage region 240 of storage array 238, flash manager 243 serves as a translation layer between the HDFS 208 and the physical memory array. More specifically, flash manager 243 translates commands received from the HDFS 208 targeting logical addresses/units (e.g., clusters) into actions performed on the physical addresses/units (e.g., blocks, pages, etc.) within mass storage region 240. In the described embodiments, HDFS 208, via flash manager 243, stores data in the form of logical areas referred to as clusters. One or more clusters are allocated to each file to be stored by LSD 204. Those of skill in the art will appreciate that a cluster is the smallest unit of memory space that may be allocated to a file and thus, every file must be allocated an integer number of clusters. It should also be noted that there is no requirement that a particular file be stored in adjacent clusters. In fact, the clusters used to store a particular file are often spread throughout the physical memory array. In other words, the files are generally "fragmented" in that the file is divided into smaller pieces that are then stored throughout the available memory array. Although a cluster is the smallest unit of memory space that may be allocated to a given file in conventional mass storage systems, the smallest storage segment of the memory array that is logically addressable by the file system is referred to as a sector. Multiple sectors form a cluster. In conventional systems, each sector is capable of storing up to 512 bytes of data. Those of skill in the art will appreciate that flash memory devices in particular are prone to wear when a single physical block is repeatedly overwritten. Thus, it is generally desirable for the LSD driver 210 and/or flash manager 243 to spread out write operations evenly on average throughout the mass storage region 240.

In the described embodiments, HDFS 208 utilizes a file allocation table (FAT) 255 to manage mass storage region 240; however, in alternate embodiments the HDFS 208 may be not be a FAT-based file system. By way of example, in other embodiments, the HDFS 208 may be a file system based on ext2, ext3, NTFS and JFFS, among others. Thus, while the invention may be practiced with other file systems, the following description focuses on FAT-based file system embodiments. By way of example, the FAT file system may be a FAT-16 or FAT-32 file system known in the art. FAT 255 may be stored in mass storage region 240 as any other data. FAT 255 may be considered a database that tracks the logical location(s) of files stored by LSD 204. However, it should be noted that in some embodiments, not all of the files stored by the LSD 204 may be tracked with the FAT 255; that is, some files stored in the storage array 238 may not be managed by the HDFS 208, and thus, any data stored in those regions will be invisible to the HDFS 208. By way of example, it may be desirable to hide certain data from the HDFS 208 and thus, this data may be stored in a portion of the memory array 238 not managed by the HDFS 208. However, for those files that are managed by the HDFS 208 (e.g., those within mass storage region 240), the FAT 255 tracks the logical addresses of the sectors and clusters that are assigned/allocated to each file. By way of example, each of the HDFS managed files has a corresponding directory entry or memory address in the FAT 255. An operating system (OS) or software application such as HDOS 216 or a host device application may access the FAT 255 to determine where the data in a file is logically located. More particularly, each file entry in the FAT 255 contains the cluster numbers of the corresponding clusters allocated to the particular file. Each cluster entry also includes a cluster number that links the current cluster to the next cluster used by the file. Each cluster not in use is typically marked with a zero or some other predetermined value in its corresponding cluster entry in the FAT 255. This alerts an OS or other application that the cluster is free and available for assignment. In this way, the FAT 255 may inform the HDFS 202 into which clusters a particular file are stored and also which clusters are available for use. In this way, the HDFS 208 may ascertain the available and total storage capacities of the LSD 204.

According to a particular embodiment of the invention, the memory addresses identified in the FAT 255 may be associated with clusters that are in turn associated with two or more sets of sectors. By way of example, the logical addresses associated with sectors physically located within the first storage area 240 within the LSD 204 (hereinafter referred to as real sectors) may represent a first set X of logical addresses. In one particular embodiment, the first set X of logical addresses may correspond to a fixed range of consecutive logical addresses identified in the FAT 255. In a representative embodiment, all of the logical addresses in the first range X are associated with real sectors physically located within the first storage area 240. Additionally, the FAT 255 may include clusters associated with one or more other sets (or ranges in some embodiments) of sectors physically located in storage arrays in devices external to LSD 222 such as, by way of example, set Y in an external device such as external LSD 222 or remote device 224. Sectors in a device external to the LSD 204 may be referred to as virtual sectors. Thus, in this example, the sectors made available to the HDFS 208 include both sets X and Y.

According a particular embodiment, the HDFS 208 may not differentiate between X and Y; that is, the HDFS perceives that the sets X and Y of logical addresses are all associated with sectors physically located within the mass storage region 240 of the LSD 204. More particularly, the physical locations of the various sectors associated with clusters identified in the FAT 255 are not available through the FAT 255 and, hence, are unknown to the HDFS 208. Consequently, the perceived storage capacity (hereinafter also referred to as the virtual storage capacity) as seen by the HDFS 208 is actually the sum of the combined storage capacities of the real and virtual sectors associated with the logical addresses in sets X and Y in the LSD 204 and the external device, respectively. Thus, although the storage capacity of the real sectors physically located within the LSD storage region 240 is fixed, the perceived storage capacity as determined by the HDFS 208 by reading the FAT 255 has effectively been expanded to include virtual sectors physically located within the external device.

In the described embodiment, a mapping module 245 is configured to map or associate particular logical sectors with either local real sectors or external virtual sectors. That is, mapping module 245 and/or flash manager 243 are responsible for associating the real and virtual sectors associated with particular logical sector numbers with the actual physical addresses (i.e., blocks, pages, etc.) within mass storage region 240 or within a storage region physically residing in an external device. Thus, in some particular embodiments, commands received from the HDFS 208 targeting logical addresses at the cluster level may be translated into logical sector numbers and in turn translated by mapping module 245 into actions performed on the physical addresses/units (i.e., blocks, pages, etc.) associated with real and virtual sectors within mass storage region 240 and an external device, respectively. In one embodiment, the translation from cluster level addresses to sector level addresses may be performed by the flash manager 243. In another embodiment, this translation may be performed by the HDFS itself.

It should be noted that, in various preferred embodiments, mapping module 245 is capable of dynamically changing the ratio of data stored in the real sectors versus that stored in the virtual sectors. More particularly, it may be desirable to dynamically adjust the allocation of real and virtual sectors to particular content including data associated with a particular file as well as metadata associated with the file and even portions of the FAT 255 itself. That is, for example, data may be transferred from one or more virtual sectors within an external device to one or more real sectors within storage region 240 and vice versa at the behest of the mapping module 245. However, in a preferred embodiment, this reallocation is invisible to the HDFS 208 as no updating of the FAT 255 is necessary.

In one particular embodiment, mapping module 245 and/or LSD agent 244 may additionally keep a separate mapping table 356 that associates the clusters identified in the FAT 255 with real and/or virtual sectors unbeknownst to the HDFS 208. This may be beneficial in embodiments in which some level of optimization is desirable such as, by way of example, embodiments in which mapping module 245 is configured to pre-fetch and cache (i.e., without specific instruction from the HDFS 208) data in sectors belonging to the same cluster or file.

Again, it should be noted that according to particular embodiments, the HDFS 208 perceives all of the clusters identified in the FAT 255 as associated with sectors and corresponding physical addresses residing within mass storage region 240 when, in fact, the clusters identified in the FAT 255 may be logically associated with both the real sectors corresponding to physical addresses in the mass storage region 240 as well as any virtual sectors corresponding to physical addresses residing in external devices. It should also be noted that a widely variable number of external storage devices may be coupled with HD 202 thereby permitting great flexibility in the expansion of the virtual storage capacity of the LSD 204 as perceived by the HDFS 208; that is, the virtual storage capacity of the LSD 204 may be expanded as long as there are file address entries available in the FAT 255 that may be associated with virtual sectors in corresponding external devices. Furthermore, in embodiments in which the LSD agent 244 has internal file system awareness (e.g., file structure and metadata awareness), the LSD agent 244 may manage its own cluster/sector mapping table.

Figure 3A:
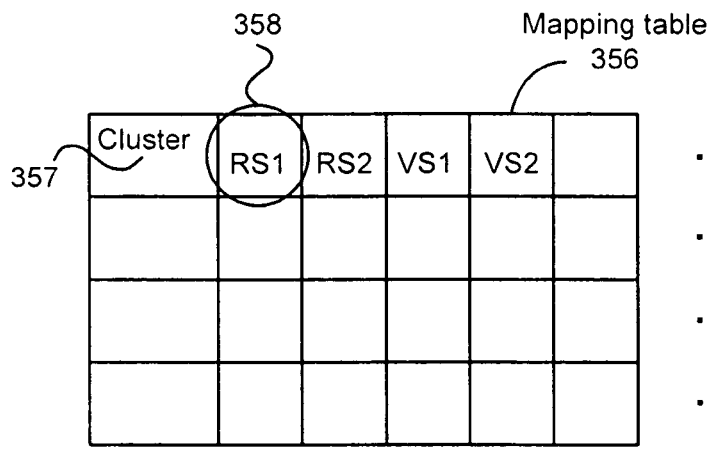
FIGS. 3A-3B illustrate diagrammatic representations of a mapping table and a perceived storage capacity, respectively, of a local storage device (LSD) in accordance with an embodiment of the invention.

FIG. 3A illustrates a diagrammatic representation of a mapping table 356 in accordance with particular embodiment in which LSD agent 244 and/or mapping module 245 are configured to manage the mapping of clusters to real and virtual sectors. Mapping table 356 includes a number of cluster entries 357 represented by rows in the mapping table. Each entry 357 includes a number of sector entries 358. In the example illustrated in FIG. 3A, a particular cluster entry 357 may be associated with both real sectors represented by, for example, entries RS1 and RS2, which may or may not be physically adjacent one another in mass storage region 240, as well as virtual sectors represented by, for example, entries VS1 and VS2, which may or may not reside within the same external device. Hence, the cluster represented by entry 357 includes data that is stored in both storage array 240 via real sectors RS1 and RS2 as well as within storage areas residing in one or more external devices via sectors VS2 and VS2. That is, in the illustrated embodiment, there is no requirement that all of the sectors associated with a particular cluster be stored either entirely locally via real sectors, or stored entirely externally via virtual sectors.

Figure 3B:
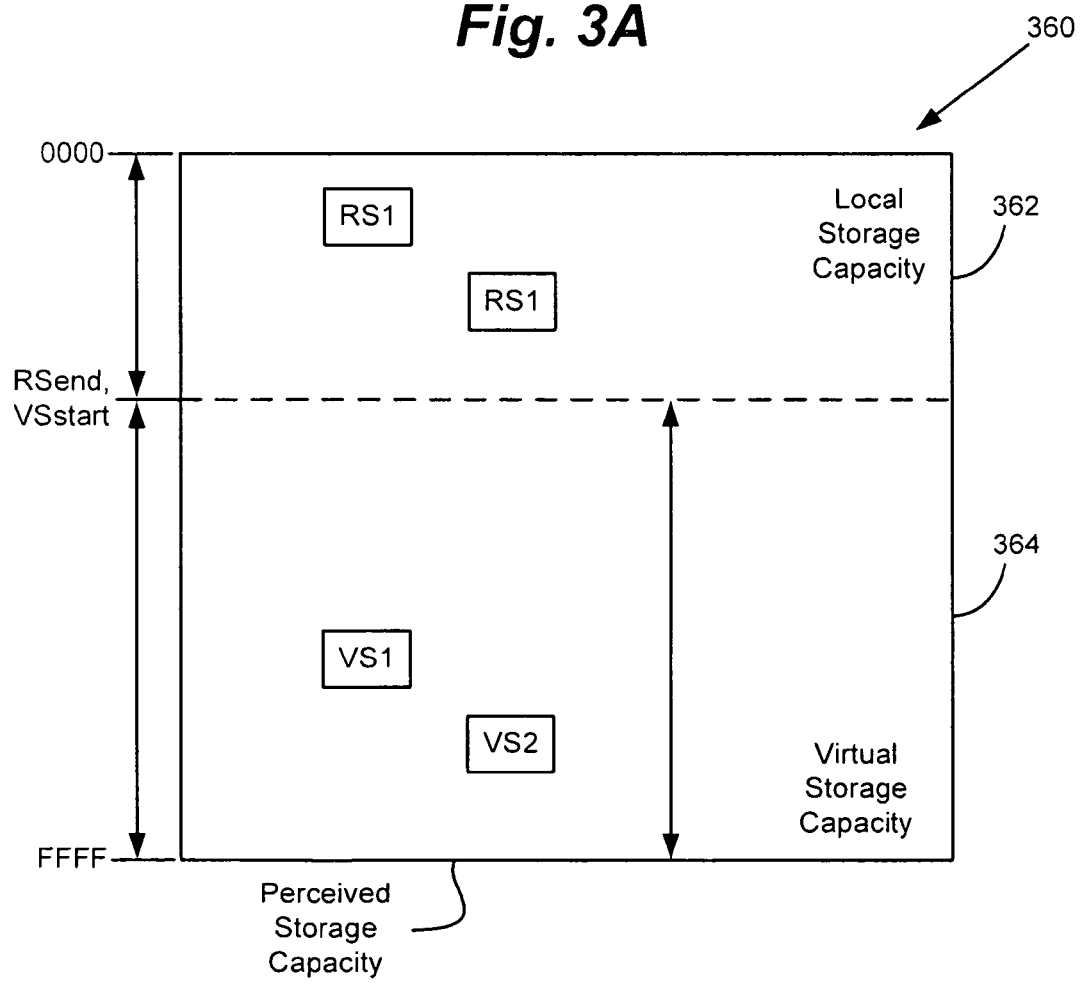

FIG. 3B illustrates a representation of the perceived storage capacity of the LSD 204 as read by the HDFS 208 in an embodiment in which all logical addresses in a given range (e.g., 0000 to xxxx) are associated with real sectors and all logical addresses in a given range (e.g., yyyy to FFFF) are associated with virtual sectors. More particularly, FIG. 3B illustrates the relationship between memory addresses in hex notation and the physical sectors associated with the memory addresses. It should be noted that this relationship is only representative of one particular embodiment, as in various alternate embodiments, both the relationship between a given logical address and associated cluster(s) as well as the relationship between a given cluster and corresponding sectors may be changed dynamically. The entire box 360 represents the perceived storage capacity of the LSD 204. In the illustrated embodiment, the upper portion 362 of the box 360 represents the memory addresses, beginning at 0000 and ending at some value xxxx, in the case of FAT 16 addressing for example, associated with the actual storage capacity of the storage array 240; that is, the real sectors such as RS1 and RS2 located within the storage array 240. Conversely, the lower portion 364 of the box 360 represents the memory addresses, beginning at yyyy (at or after xxxx) and ending at FFFF, in the case of FAT 16 addressing, associated with the virtual storage capacity of the LSD 204; that is, clusters residing in external devices such as VC1 and VC2.

Figure 4:
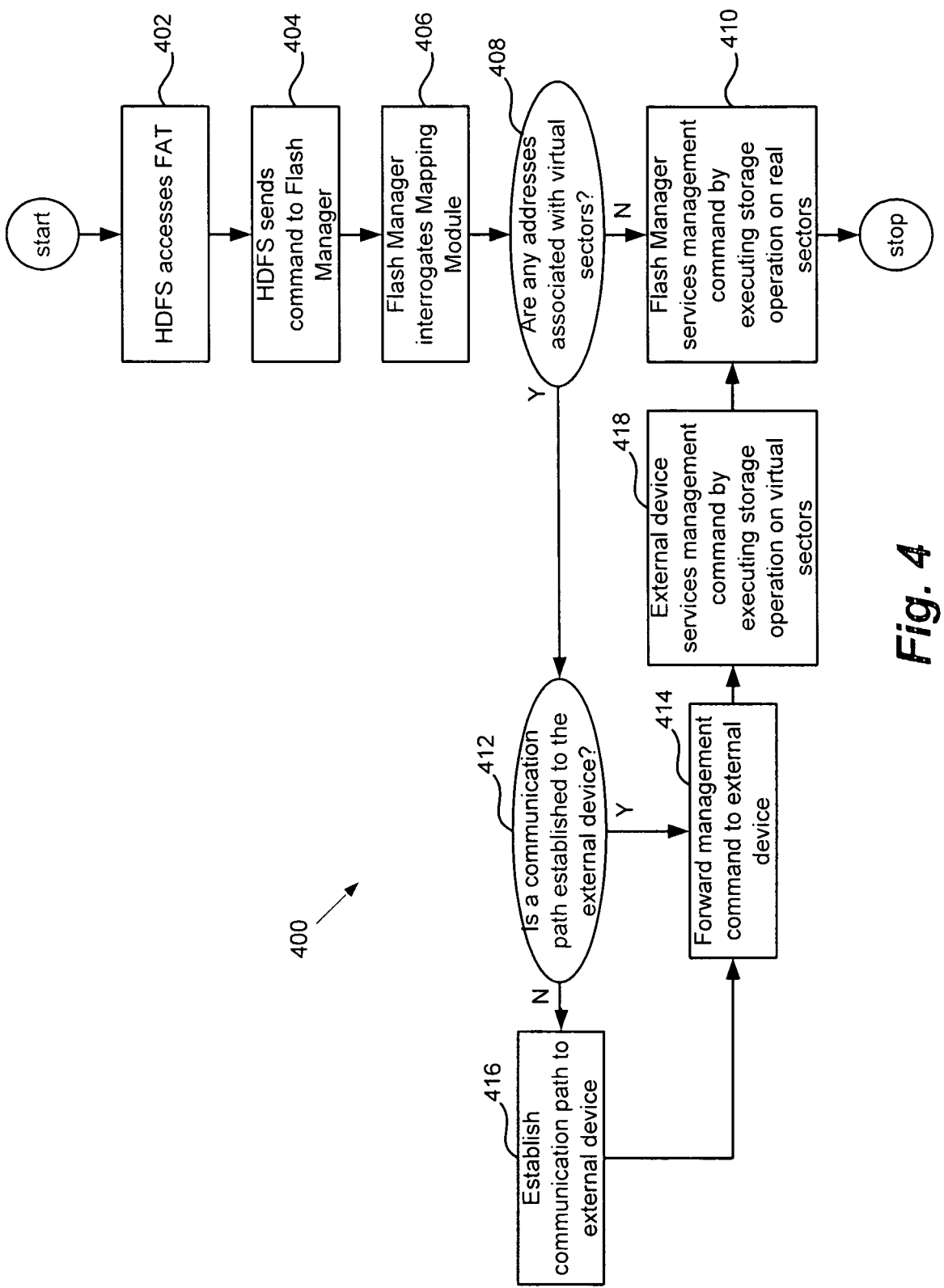
FIG. 4 shows a flowchart illustrating a process for servicing a management command in accordance with an embodiment of the invention.
Figure 5:
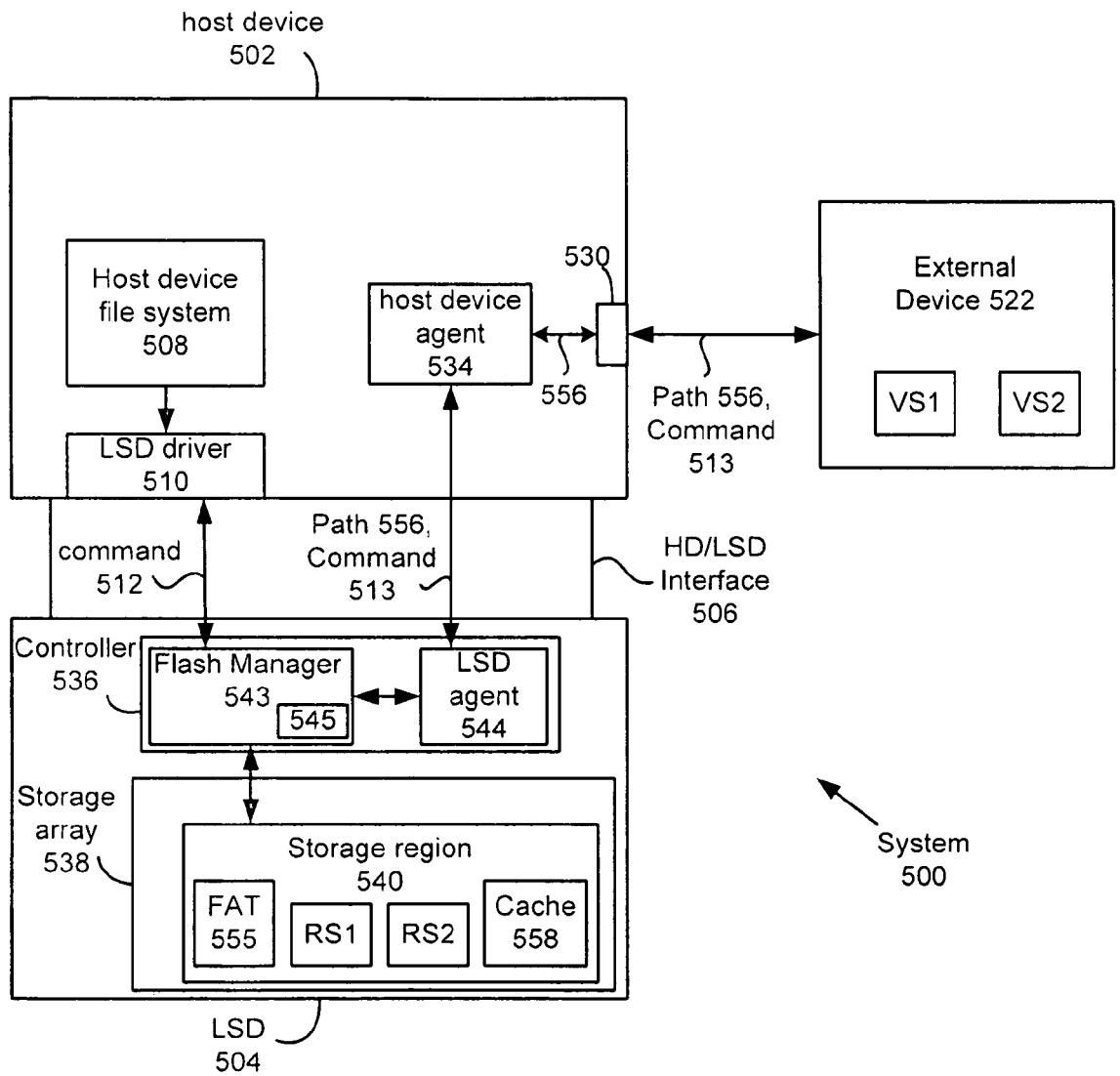
FIG. 5 illustrates a system suitable for use with the process of FIG. 4.

For the purpose of illustrating a few particular embodiments of the present invention, a process 400 of servicing a management command by an LSD 504 sent from an HD 502 to the LSD 504 is described with reference to the flowchart of FIG. 4 and the system of FIG. 5. Process 400 may begin at 402 with HDFS 508 accessing FAT 555. This enables HDFS 508 to check the mapping of data the HDFS presumes is actually stored by LSD 504 within storage array 538 and to identify logical addresses for a subsequent storage operation. However, in some cases the FAT 555 may already be cached within local memory within HD 502 and the logical addresses and corresponding clusters may already be identified. In the former case, flash manager 243 and/or mapping module 545 may determine, in some embodiments, which logical address (es) were shown interest by HDFS 508 during the accessing 402. More particularly, in these embodiments, mapping module 545 is able to discern which sectors the HDFS 508 intends for a storage operation and then is able to anticipate which sectors will be targeted by a subsequent command from the HDFS 508.

At 404, flash manager 543 receives a management command 512 from HDFS 508 requesting a desired storage operation. By way of example, the management command 512 may include a read, write or erase command and the associated logical addresses where the storage operation is to be executed, and in the case of a write command, the data to be written to the logical addresses. In some embodiments, this command may be predicted (e.g., based on some intelligent pre-fetching mechanism known in the prior art). At 406, flash manager 543 interrogates mapping module 545 which manages/maintains the mapping between logical sector numbers and associated real and virtual sectors. At 408, mapping module 545 determines if some or all of the logical addresses associated with the command sent by the HDFS 508 are associated with virtual sectors (e.g., virtual sector VS1 or VS2) referring to sectors physically residing in a device 522 external to the LSD 504 (e.g., a second LSD, a remote network device, or a non-removable device embedded within the HD). In a preferred embodiment, the actions taken by the mapping module 545 are independent from and transparent to the HDFS 508. In this way, no updates or other changes to legacy components such as the HDFS 508 or LSD driver 510 are required. If it is determined at 408 that all of the sectors are real sectors physically residing in a mass storage region 540 of storage array 538 (e.g., real sector RS1 or RS2), then flash manager 543 may service the command 512 at 410. More particularly, if mapping module 545 determines that the management command 512 is entirely associated with real sectors, then the requested storage operation may be executed on these targeted real sectors in real time at 410. The servicing of the command 512 will also generally include transmitting a response from LSD 504 to HDFS 508. The response may include an acknowledgement that the requested operation was executed and/or data associated with the requested operation.

If, however, mapping module 545 determines at 408 that at least some of the sectors associated with the management command 512 are virtual sectors then, at 412, the LSD agent 544 determines if a communication path is established between the LSD 504 and the external device 522 having an associated storage array that includes the physical location of the virtual sectors (e.g., VS1 and VS2). By communication path it is meant that the LSD 504 and external device 522 have a capable command path established between them via HD 502. By capable, it is meant that there is a physical connection established, a wireless connection established, or a logical connection established between the LSD 504 and external device 522 via LSD agent 544, host device agent 534 and interface 530 over which information may be passed, and in a preferred embodiment, unbeknownst to HDFS 508.

In the illustrated embodiment, if it is determined at 412 that a communication path 556 is established between LSD 504 and external device 522 then the LSD agent 544 forwards at 414 a management command 513 based on the management command 512 to the external device 522 and which instructs the external device 522 to perform a requested storage operation on a number of virtual sectors. In some embodiments the establishment of the communication path 556 may be initiated prior to actually receiving the management command 512 from the HDFS 508 based on a predicted management command as described above. In parallel, there may be some local cache management operation for storage region 540. In some embodiments, a local cache 558 may be a part of storage region 540, while in other embodiments the cache may be located within RAM outside of storage array 538. Managing a local cache 558 may involve cooperation between flash manager 543 (and/or mapping module 545) and LSD agent 544 to optimally ensure that there is sufficient storage room in the cache 558 for data to be stored locally (e.g., data to be written to the external device 522 from the HD 502 in the case of a write operation or data fetched through LSD agent 544 from the external device 522 to be transmitted to the HDFS 508 in the case of a read operation). Sufficient storage room may be evacuated by erasing local data from the cache 558, transferring local data to be written from the local cache 558 to the external device 522 or by transferring local data to be read from the local cache 558 and transferred to the HD 502.

In some embodiments, the LSD agent 544 may be involved in the cache management operations as the LSD agent 544 may have some file system structure awareness which may allow the LSD agent 544 to introduce some level of optimization in the management of the cache. More particularly, if LSD agent 544 is aware of the remaining sectors to fetch for the cluster related to the given file, for example, the LSD agent 544 may ensure that there is sufficient storage in the local cache 558 within the LSD in advance. File system structure awareness may also enable the LSD agent 544 to identify the current content stored in the cache 558 that is desirable to maintain locally. Hence, LSD agent 544 may perform some level of intelligent caching.

At 418, external device 522 executes the requested storage operation on the virtual sectors in response to management command 513 (and indirectly through management command 512). It should be noted that the second command 513 sent to the external device 522 may not always instruct the external device to perform a storage operation on the virtual sectors associated with logical address identified in the first command 512. That is, in some cases, even though all of the logical addresses identified in the management command 512 are associated with real sectors, it may be desirable to free storage space in the mass storage region 540 by writing data from real sectors within the mass storage region 540 not associated with the first management command 512 into virtual sectors within the external device 522. Thus, the second command 513 may be a write command containing data from the real sectors within the mass storage region 540 and instructing the external device 522 to write the data from the real sectors into virtual sectors within the external device. Additionally, if the management command 512 sent by the HDFS 508 included addresses associated with both real and virtual sectors then, the flash manager 543 may execute the requested storage operation on the real sectors at 410 in parallel with the forwarding of the management command 513 to external device 522 and/or in parallel with the executing of the requested storage operation on the virtual sectors by external device 522.

Alternatively, according to particular embodiments, if it is determined at 412 that a communication path 556 does not exist then, at 416, LSD agent 544 prompts HD 502 by way of HD agent 534 to establish a communication path 556 between LSD 504 and external device 522. More particularly, as described above with reference to the communication path 256 of FIG. 2, and in more detail in co-pending U.S. patent application Ser. No. 12/019,573 filed on Jan. 24, 2008 entitled "DISTRIBUTED STORAGE SERVICE SYSTEMS AND ARCHITECTURE" by Nochimowski et al. and/or co-pending U.S. patent application Ser. No. 12/029,356 filed on Feb. 11, 2008 entitled "STORAGE DEVICE HAVING DIRECT USER ACCESS" by Nochimowski et al., LSD 504 may prompt HD 502 to execute a requested process establishing the communication path 556 to external device 522 using a network interface or a local communication path, for example. Once established, however, information may be passed between the LSD 504 and external device 522 without further intervention by HD 502 (except for any intervention related to the passing of data, such as data packet routing) and also being invisible to HDFS 508. Once the communication path 556 is established, the process proceeds to 414 where the management command 513 is sent to the external device 522 at which point the external device 522 may perform the requested storage operation on the virtual sectors.

Thus, in various embodiments, the servicing of a single command 512 initiated by the HDFS 508 may generally involve a number of operations, both internal to the LSD 504 as well as in relation to an external device 522. While the process 400 described above represents general implementations of various embodiments of the present invention, the following description will provide more specific implementations of particular embodiments of the present invention.

More particularly, in the case that the management command 512 is a write command, if any of the logical addresses identified in the write command 512 are associated with real sectors residing in storage region 540, then data may be written to these targeted real sectors in real time at 410 as described above. A response including an acknowledgment that the write command has been serviced may then be sent to the HDFS 508. If, however, some or all of the logical addresses are associated with virtual sectors then, LSD agent 544 forwards the write command 513 and associated data to external device 522 along communication path 556 unbeknownst to HDFS 508 instructing external device 522 to write the associated data to the relevant physical counterparts of the virtual sectors residing in external device 522 as described above.

Alternately, it may be desirable to wait before forwarding the data and write command 513 to the external device 522. By way of example, it may be advantageous to temporarily store the data within cache 558 within the LSD 504 until certain predetermined conditions are met. By way of example, it may be desirable to temporarily store the data in cache 558 and wait to forward the cached data to the external device 522 until a predetermined level of bandwidth is available over the communication path 556. Additionally, it may be more efficient to wait until a predetermined quantity of data is cached before forwarding data to the external device 522 where it is then written. For these and other considerations, servicing the write command 512 may first involve caching the data temporarily and sending a response to the HDFS 508 including an acknowledgment that the write command has been serviced (although in other embodiments the acknowledgment response may be sent later as long as the acknowledgment is sent within HDFS required time constraints). The servicing may then involve a determination as to whether or not the data to be written to the virtual sectors (or even the command 513 itself) associated with the write command 512 should be forwarded to the external device 522 during the present clock window. Concurrently, before or after this determination, other portions of the data to be written to the real sectors by flash manager 543 may be written at 410. If the data is to be forwarded during the current clock window then the data is forwarded where it is then written to the virtual sectors within external device 522. In some embodiments, the forwarding of the data may be performed progressively; that is, various "chunks" or portions of the data may be forwarded when possible or otherwise deemed appropriate. If the data is not to be forwarded to the external device 522 during the current clock window, then the data may be stored in cache 558 where it remains until the controller 536 determines that the data should be forwarded to the external device 522 to be written.

It should be noted that in particular embodiments, the FAT 555 needs not to be modified if a portion of the data destined for the virtual sectors is cached. Additionally, in one embodiment, flash manager 243 and/or mapping module 545 may map the virtual sector location(s) to temporary cache location(s) such that the FAT 555 accessed by the HDFS 508 does not have to be modified. In fact, both real and virtual sectors associated with clusters identified in the FAT 555 in general may not always correspond to the same physical sectors in storage region 540 or within external devices.

In the case that the management command 512 is a read command, if any of the logical addresses identified in the read command 512 are associated with real sectors residing in storage region 540, then data may be read from the real sectors at 410 and subsequently transmitted to HDFS 508. If, however, some or all of the logical addresses are associated with virtual sectors then, LSD agent 544 forwards a read command 513 at 414 to external device 522 along communication path 556 unbeknownst to HDFS 508 instructing external device 522 to read from the relevant physical counterparts of the virtual sectors residing in external device 522 as described above. The data read from the external device 522 may then be forwarded along communication path 556 to LSD 504 whereupon it may then be temporarily stored locally in cache 558 before being forwarded to HDFS 508 as if it had been read directly from storage region 540.

It should be noted that the management and transfer of data between the LSD 504 and HD 502, and particularly between the flash manager 543 and HDFS 508, are usually submitted to a number of restrictions including time-outs etc. (i.e. on legacy storage buses such as SD, MMC etc. the HD expects to receive a response from the LSD in a limited time period (e.g. at most 100 ms), after which it considers the request to be aborted which may result in re-setting the system . . . ). Thus, while conventional legacy host devices, storage devices and buses communicate and manage the transfer of data based on 'guaranteed response time,' the communication and transfer of data between LSD 504 (particularly LSD agent 544) and external device 522 may be based on 'best effort'.

According to one particular embodiment, this difficulty may be mitigated by the use of intelligent mapping and/or caching. More particularly, the flash manager 543 and/or mapping module 545 may dynamically manage the real/virtual sector mapping. By way of example, flash manager 543 and/or mapping module 545 may note which files are most commonly used and, consequently, dynamically modify the real and virtual allocation of sectors (transparently to the HDFS 508 and possibly as background operations) so as to ensure that the most commonly used files are stored within real sectors while the least used files are stored in virtual sectors in external devices. That is, if a certain file stored in virtual sectors undergoes high usage (e.g., is read often), then mapping module 545 and flash manager 543 may dynamically initiate a transfer of the data associated with the highly used file from the virtual sectors within the external device 522 to real sectors with storage region 540. Alternatively, highly read data may be preemptively (and at least temporarily) stored within cache 545. Conversely, data associated with infrequently accessed files may be dynamically transferred from real sectors within storage region 540 to virtual sectors within external device 522 at the behest of mapping module 545 and/or flash manager 543.

Additionally, in some embodiments, the LSD driver or HDFS 508 may be configured so as to allow more flexibility if such flexibility is supported. By way of example, if the storage operation may not be performed within a 'guaranteed response time' defined by the storage interface standard (e.g. where the external device 522 is another LSD and the communication is rapid) then a retry message may be sent. Additionally, a Quality of Services (QOS) paradigm may be setup so as to allow for servicing and the transfer of data between LSD 504 and external device 522 under the time limit constraint. By way of example, the QOS paradigm may include factors such as available bandwidth, amount of data to be transferred, and the amount of data already cached, among many others.

The advantages of the invention are numerous. Different embodiments or implementations may yield one or more of the following advantages. One advantage of the invention is legacy devices may be added or removed without consideration of modifying system hardware. Another advantage of the invention is that it may be used with any host computer provided the host has an embedded host device agent as described above therefore reducing the cost and increasing the applicability of the invention.

The many features and advantages of the invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of servicing a management command sent from a host device file system (HDFS) within a host device (HD), the method comprising:
   in a local storage device (LSD) in communication with the HD over a HD/LSD interface configured to connect with the host device such that the LSD is connected exclusively with the HD:
      receiving a first management command from the HD over a first communication path over the HD/LSD interface, the first management command instructing the LSD to execute an operation on associated logical addresses;
      when the first management command is associated with at least a first set of logical addresses, sending from the LSD, over a second communication path established over the HD/LSD interface, a second management command to a remote device (RD) external to the LSD and the HD that instructs the RD to execute an operation on memory locations within the RD, the sending of the second management command to the RD and the execution of the operation associated with the first management command on the memory locations within the RD being invisible to the HDFS; and
      when the first management command is not associated with at least the first set of logical addresses, servicing the first management command only by way of operations executed on memory locations within the LSD;
      wherein the LSD manages the storage of data files such that commonly accessed data files are stored at the LSD and data files that are not commonly accessed are stored at the RD.

2. The method as recited in claim 1, wherein the LSD presents a perceived storage capacity (PSC) to the HDFS, the PSC comprising an amount of storage capacity at least equal to a sum of the RD storage capacity and the LSD storage capacity.

3. The method as recited in claim 1, further comprising:
   if the first management command is associated with at least the first set of logical addresses,
   prompting the HD by the LSD to establish the second communication path between the LSD and the RD via the HD, wherein once the communication path is established, no further intervention by the HD is required except to maintain the communication path; and
   logically interacting with the RD over the second communication path, wherein the logical interacting and the prompting are each invisible to the HDFS.

4. The method as recited in claim 3, wherein the logically interacting comprises:
   sending at least the second management command from the LSD to the RD;
   receiving an RD response from the RD in response to the second management command; and
   sending at least an LSD response from the LSD to the HDFS.

5. The method as recited in claim 4, wherein when the first management command is a memory WRITE command, then the second management command is a WRITE command that includes data to be stored in the RD and wherein the RD response includes a WRITE acknowledgment signal.

6. The method as recited in claim 5, wherein the data to be stored in the RD is cached in the LSD prior to being forwarded to the RD.

7. The method as recited in claim 4, wherein when the first management command is a memory READ command, then the second management command is a READ command and wherein the RD response includes data to be sent to the HD via the LSD response.

8. The method as recited in claim 1, wherein the LSD further comprises:
   an LSD memory controller including a memory manager arranged to manage at least a mass storage region of the LSD memory array based at least upon management commands received from the HDFS.

9. The method as recited in claim 8, wherein the mass storage region of the LSD memory array includes a file allocation table (FAT) that includes at least one FAT entry having at least a data file identifier entry corresponding to a data file and including logical addresses associated with the data file.

10. The method as recited in claim 9, further comprising mapping, with a mapping module in the LSD, the logical sector addresses associated with the file to real sectors or virtual sectors, wherein real sectors comprise physical sectors in the LSD and virtual sectors comprise physical sectors within the RD.

11. The method as recited in claim 10, further comprising dynamically modifying the allocation of real and virtual sectors to content stored within the LSD memory array and the RD transparently to the HDFS.

12. The method as recited in claim 11, wherein most commonly accessed files are stored in real sectors.

13. A local storage device (LSD) comprising:
a host device/local storage (HD/LSD) interface configured for connecting with a host device (HD) having at least a host device file system (HDFS), wherein the HD/LSD connects the LSD to the HD such that the LSD is connected exclusively with the HD; and
a memory array, the memory array being logically arranged to include at least one mass storage region externally managed by the HDFS; and
a LSD controller in communication with the HD/LSD interface and the memory, the LSD controller configured to:
receive a management command by way of a first communication path over the HD/LSD interface, the management command instructing the LSD to execute an operation on associated logical addresses;
when the LSD controller determines that a first management command received from the HDFS is associated with at least a first set of logical addresses, send a second management command from the LSD to a remote device (RD) external to the LSD and the HD by way of a second communication path over the HD/LSD interface that instructs the RD to execute an operation on memory locations within the RD, the sending of the second management command to the RD and the execution of the operation associated with the first management command on the memory locations within the RD being invisible to the HDFS; and
when the LSD controller determines that the first management command received from the HDFS is associated with at least a second set of logical addresses, execute the first management command on memory locations within the LSD mass storage region;
wherein the LSD manages the storage of data files such that commonly accessed data files are stored at the LSD and data files that are not commonly accessed are stored at the RD.

14. The LSD as recited in claim 13, wherein the LSD comprises a perceived storage capacity (PSC), the PSC being an amount of storage capacity of the LSD perceived by the HDFS, and wherein the PSC is at least equal to sum of RD storage capacity and LSD storage capacity.

15. The LSD as recited in claim 13, wherein if the first management command is associated with at least the first set of logical addresses, the controller is configured to, with an LSD agent within the LSD controller, prompt the HD to establish the second communication path between the LSD and the RD via the HD, wherein once the second communication path is established the LSD and the RD logically interact over the second communication path, wherein the logical interaction and the prompting are each invisible to the HDFS.

16. The LSD as recited in claim 15, wherein, to logically interact, controller is configured to:
send at least the second management command from the LSD to the RD;
receive an RD response from the RD in response to sending the second management command; and
send at least an LSD response from the LSD to the HDFS.

17. The LSD as recited in claim 16, wherein when the first management command is a memory WRITE command, then the second management command is a WRITE command that includes data to be stored in the RD and wherein the RD response includes a WRITE acknowledgment signal.

18. The LSD as recited in claim 17, wherein the controller is configured to cache data to be stored in the RD in the LSD prior to forwarding the data to the RD.

19. The LSD as recited in claim 16, wherein when the first management command is a memory READ command, then the second management command is a READ command and wherein the RD response includes data to be sent to the HD via the LSD response.

20. The LSD as recited in claim 13, wherein the LSD memory array includes a file allocation table (FAT) that includes at least one FAT entry having at least a data file identifier entry corresponding to a data file and including logical addresses associated with the data file.

21. The LSD as recited in claim 20, where the LSD further comprises a mapping module configured to map logical sector addresses associated with the file to real sectors or virtual sectors, wherein real sectors comprise physical sectors in a memory array of the LSD and virtual sectors comprise physical sectors within the RD.

22. The LSD as recited in claim 21, wherein the mapping module is configured to dynamically modify the allocation of real and virtual sectors to content stored within the LSD memory array and the RD transparently to the HDFS.

23. The LSD as recited in claim 22, wherein the most commonly accessed files are stored in real sectors.

24. The LSD of claim 13, wherein the LSD is embedded in the HD.

25. The method of claim 1, wherein the LSD is embedded in the HD.

26. The method of claim 1, wherein the LSD comprises three-dimensional memory.

27. The LSD of claim 13, wherein the memory array comprises three-dimensional memory.

* * * * *

UNITED STATES PATENT AND TRADEMARK OFFICE
CERTIFICATE OF CORRECTION

PATENT NO. : 8,959,285 B2
APPLICATION NO. : 12/101065
DATED : February 17, 2015
INVENTOR(S) : Alain Nochimowski et al.

Page 1 of 1

It is certified that error appears in the above-identified patent and that said Letters Patent is hereby corrected as shown below:

On the Title Page

Left column, item (73), replace "SanDisk Technologies Inc., Plano, Texas (US)" with --SanDisk IL Ltd., Kfar Saba (IL)--.

Signed and Sealed this
First Day of December, 2015

Michelle K. Lee
*Director of the United States Patent and Trademark Office*